(12) United States Patent
Song et al.

(10) Patent No.: US 11,049,650 B2
(45) Date of Patent: Jun. 29, 2021

(54) CAPACITOR COMPONENT

(71) Applicant: SAMSUNG ELECTRO-MECHANICS CO., LTD., Suwon-si (KR)

(72) Inventors: Jun Il Song, Suwon-si (KR); Beom Seock Oh, Suwon-si (KR); Woo Chul Shin, Suwon-si (KR); Byung Rok Ahn, Suwon-si (KR); Kyoung Jin Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 5 days.

(21) Appl. No.: 16/668,640

(22) Filed: Oct. 30, 2019

(65) Prior Publication Data

US 2021/0020363 A1  Jan. 21, 2021

(30) Foreign Application Priority Data

Jul. 15, 2019  (KR) .................. 10-2019-0085034

(51) Int. Cl.
| | |
|---|---|
| *H01G 4/008* | (2006.01) |
| *H01G 4/012* | (2006.01) |
| *H01G 4/30* | (2006.01) |
| *H01G 4/232* | (2006.01) |
| *H01G 4/248* | (2006.01) |
| *C22C 19/03* | (2006.01) |
| *H01G 4/12* | (2006.01) |

(52) U.S. Cl.
CPC .......... *H01G 4/0085* (2013.01); *C22C 19/03* (2013.01); *H01G 4/012* (2013.01); *H01G 4/2325* (2013.01); *H01G 4/248* (2013.01); *H01G 4/30* (2013.01); *H01G 4/1227* (2013.01)

(58) Field of Classification Search
CPC .... H01G 4/0085; H01G 4/2325; H01G 4/012; C22C 19/03
See application file for complete search history.

(56) References Cited

U.S. PATENT DOCUMENTS

| 7,006,345 | B2 * | 2/2006 | Nakano ................ | H01G 4/1227 29/25.42 |
|---|---|---|---|---|
| 7,224,570 | B2 * | 5/2007 | Yamaguchi .......... | H01G 4/0085 29/25.42 |
| 10,692,654 | B2 * | 6/2020 | Cha ......................... | H01G 4/30 |
| 10,818,437 | B2 * | 10/2020 | Cha ......................... | H01G 4/12 |
| 10,840,017 | B2 * | 11/2020 | Cha ...................... | H01G 4/0085 |
| 10,847,321 | B2 * | 11/2020 | Cha ......................... | H01G 4/12 |
| 2006/0043523 | A1 | 3/2006 | Ito et al. | |

(Continued)

FOREIGN PATENT DOCUMENTS

| JP | 2000106035 A | * | 4/2000 | .............. H01G 4/12 |
|---|---|---|---|---|
| JP | 2006-73623 A | | 3/2006 | |

(Continued)

*Primary Examiner* — Nathan Milakovich
(74) *Attorney, Agent, or Firm* — Morgan, Lewis & Bockius LLP

(57) ABSTRACT

A capacitor component includes a body including a dielectric layer and an internal electrode, the internal electrode including nickel and an alloying element, and an external electrode disposed on the body to be connected to the internal electrode. The internal electrode includes an alloy region and an alloying element region.

10 Claims, 14 Drawing Sheets

(56) References Cited

U.S. PATENT DOCUMENTS

| | | | |
|---|---|---|---|
| 2008/0035244 A1 | 2/2008 | Suzuki et al. | |
| 2012/0026642 A1* | 2/2012 | Kaneko | H01G 4/30 |
| | | | 361/321.4 |
| 2015/0155098 A1* | 6/2015 | Yamaguchi | H01G 4/30 |
| | | | 361/301.4 |
| 2016/0358713 A1 | 12/2016 | Doi et al. | |
| 2019/0304696 A1* | 10/2019 | Kim | H01G 4/012 |
| 2020/0058442 A1* | 2/2020 | Cha | H01G 4/12 |
| 2021/0035736 A1* | 2/2021 | Cha | H01G 4/30 |
| 2021/0057164 A1* | 2/2021 | Cha | H01G 4/30 |

FOREIGN PATENT DOCUMENTS

| | | | |
|---|---|---|---|
| JP | WO2006/035840 A1 | 4/2006 | |
| JP | 2017-5019 A | 1/2017 | |
| KR | 20190121149 A * | 10/2019 | H01G 4/12 |
| KR | 20190121152 A * | 10/2019 | H01G 4/0085 |

\* cited by examiner

CAPACITOR COMPONENT

CROSS-REFERENCE TO RELATED APPLICATION(S)

This application claims benefit of priority to Korean Patent Application No. 10-2019-0085034 filed on Jul. 15, 2019 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor (MLCC), a capacitor component, has advantages such as compactness, guaranteed high capacitance, and ease of mountability.

Recently, ceramic electronic components, in detail, multilayer capacitors, have significantly increased in capacitance. To secure capacity, the number of laminated layers should be increased. However, to increase the number of laminated layers, a dielectric layer and an internal electrode need to be thinned.

As an internal electrode is thinned, disconnection of the electrode may be increased to cause vulnerability to permeation of moisture and reductions in chip strength.

SUMMARY

An aspect of the present disclosure is to provide a capacitor component having improved moisture resistance reliability and enhanced chip strength.

According to an aspect of the present disclosure, a capacitor component includes a body including a dielectric layer and an internal electrode, the internal electrode including nickel and an alloying element, and an external electrode disposed on the body to be connected to the internal electrode. The internal electrode includes an alloy region and an alloying element region.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
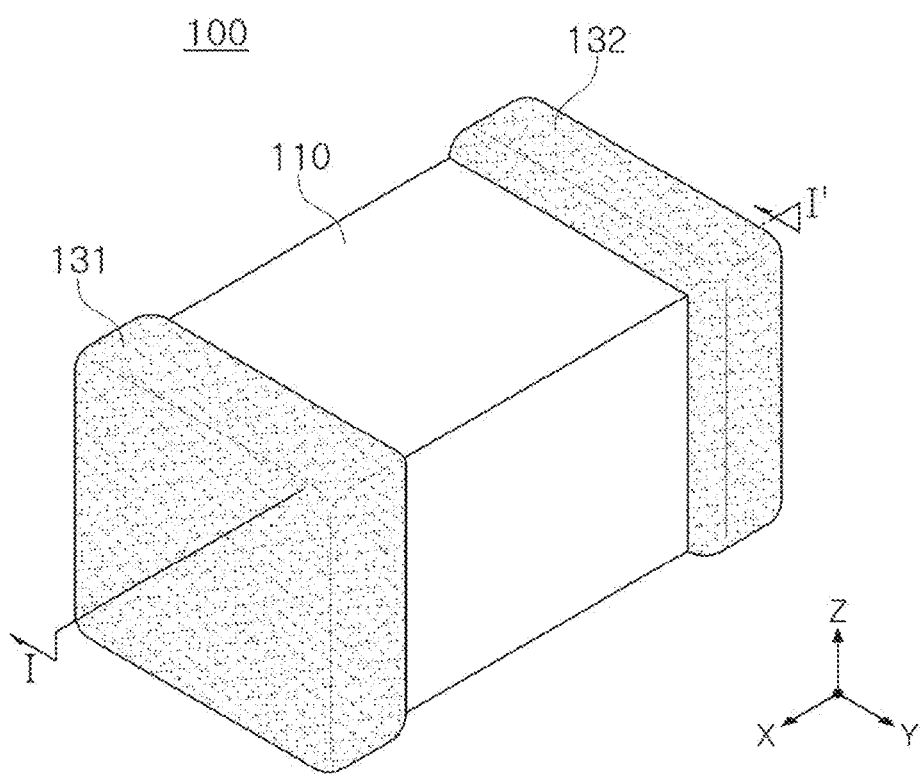
FIG. 1 is a schematic perspective view of a capacitor component according to an embodiment in the present disclosure.

Hereinafter, example embodiments in the present disclosure will now be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

Throughout the specification, when a component is referred to as "comprise" or "comprising," it means that it may include other components as well, rather than excluding other components, unless specifically stated otherwise.

In the drawings, a Z direction defined as a first direction, a T direction, or a thickness direction, an X direction may be defined as a second direction, an L direction, or a length direction, a Y direction may be defined as a third direction, and a W direction, or a width direction.

Hereinafter, a capacitor component according to an example embodiment in the present disclosure will be described in detail with reference to FIGS. 1 to 4.

A capacitor component 100 according to the present disclosure may include a body 110 including dielectric layers 111 and internal electrodes, disposed with respective dielectric layers interposed therebetween, each including nickel and alloying elements, and external electrodes 131 and 132 disposed on the body 110 to be electrically connected to the internal electrodes. The internal electrode may include an alloy region 152 and the alloying element region 151.

Figure 2:
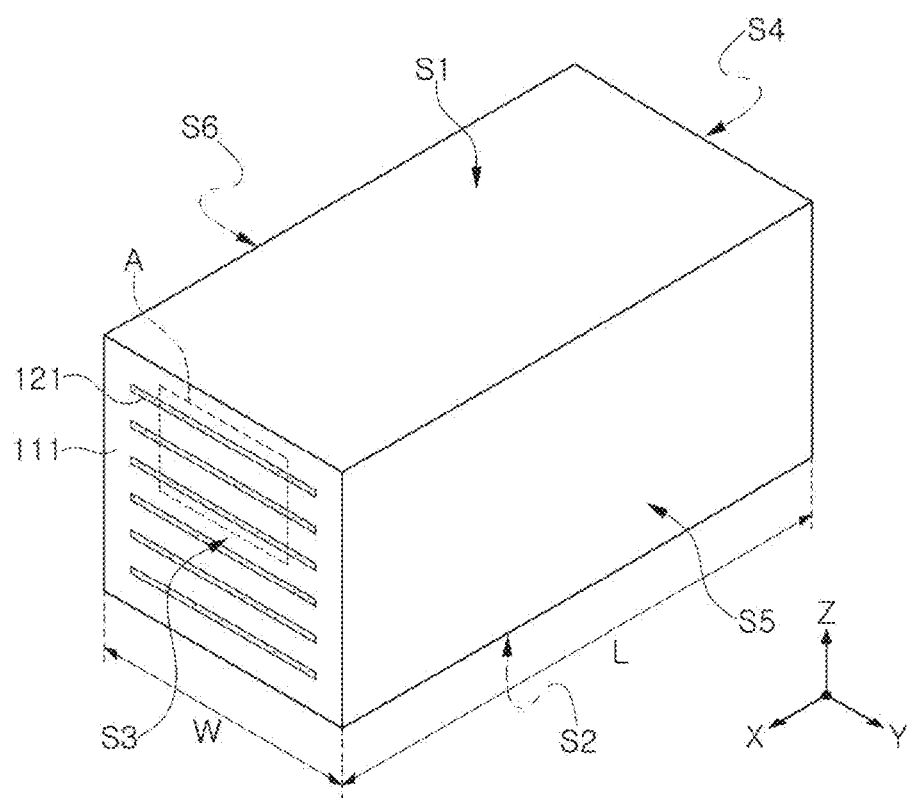
FIG. 2 is a schematic perspective view of a body of the capacitor component of FIG. 1.

FIG. 1 is a schematic perspective view of a capacitor component according to the present disclosure, FIG. 2 is a schematic perspective view of a body of the capacitor component according to the present disclosure, and FIG. 3 is an enlarged view of region A of FIG. 2.

Referring to FIG. 3, in an embodiment, the internal electrode may include the alloy region 152 and the alloying element region 151. In the present specification, the term "alloy region" may refer to a region including an alloy of nickel and an alloying element, and the alloy is obtained by adding at least one element, different from a metal, to the metal and has metal properties. The alloy region may include, for example, nickel and an alloying element, and the alloying element may refer to a heterogeneous element of nickel. A ratio of the metal and the heterogeneous element of the alloy is not limited, and the alloy region may include, for example, an alloy including 1 to 99 percent by weight (wt %) of nickel. The capacitor component according to the present disclosure may include an internal electrode, including an alloy region and an alloying element region, to compensate for disconnection of the internal electrode.

In an embodiment, the alloying element region 151 may be a region including an alloying element as a main element.

In the present specification, the term "alloying element region" may refer to a region including an alloying element as a main element, and the phrase "including alloying element as a main element" may refer to including 50 wt % or more of alloying elements relative to total weight of the respective alloying element region. As described later, the alloying element region is formed by exuding an alloying element, included in the internal electrode, and may serve to fill a disconnected portion of the internal electrode.

In an example, the alloying elements of the present disclosure may be a period 3 element or a period 4 element, or may be an element able to form an alloy with nickel among the elements belonging to groups 11 to 14. The alloying element maybe, for example, at least one of silicon (Si), aluminum (Al), magnesium (Mg), iron (Fe), phosphorus (P), tin (Sn), zinc (Zn), dysprosium (Dy), copper (Cu), or alloys thereof, but is not limited thereto. The alloying element may be applied to the internal electrode to exude elements, not forming an alloy, during sintering of a body including the internal electrode.

In an embodiment, the alloying element region may satisfy an area fraction of 5% to 60% relative to the entire internal electrode. The area fraction of the alloying element region, included in the internal electrode, may be measured by observing a cross-section of the body 110 in a length-thickness (X-Z) direction. For example, after the cross-section in a length-thickness (X-Z) direction in the center of the body 10 in a width (Y) direction is captured using a scanning electron microscope (SEM), an atomic force microscope (AFM), a transmission electron microscope (TEM), or the like, the area fraction may be analyzed using image analysis software (the National Institutes of Health (NIH) open source, "Image J" or MathWorks Inc., "MAT-LAB"), or the like. In addition, chemical components and compositions may be analyzed by applying energy dispersive spectroscopy (EDS), electron energy loss epectroscopy (EELS), or the like, to SEM and/or TEM. In one example, the area fraction of the alloying element region, included in the internal electrode, may be a ratio of a sum of areas of all of the alloying element regions of one internal electrode to an entire area of the one internal electrode. In another example, the area fraction of the alloying element region, included in the internal electrode, may be a ratio of a sum of areas of all of the alloying element regions of the analyzed region of one internal electrode to an entire area of the analyzed region of the one internal electrode.

Figure 3A:
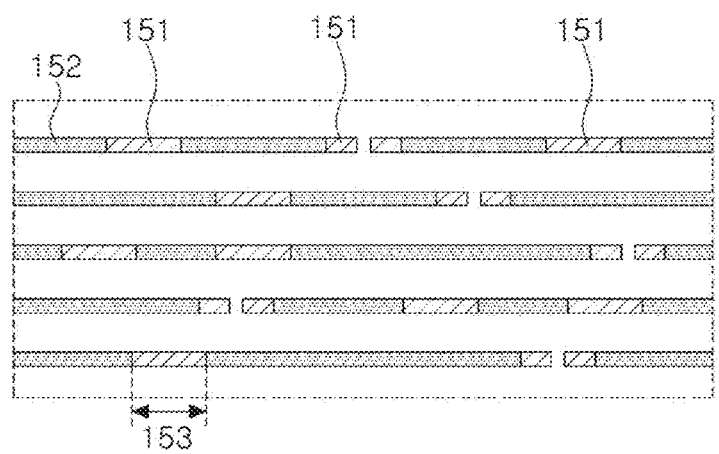
FIG. 3A is an enlarged view of region A of FIG. 2.
Figure 3B:
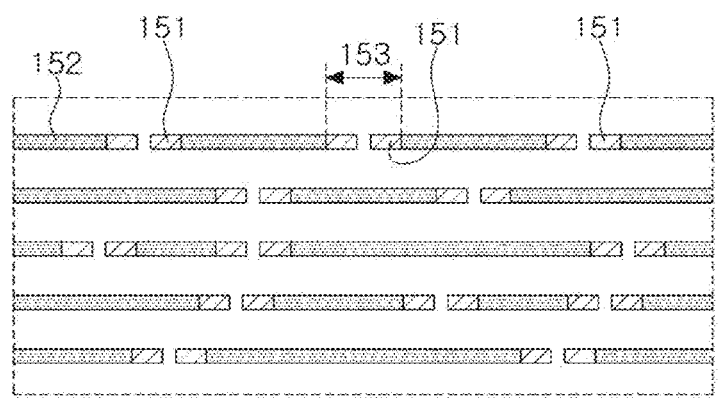
FIG. 3B is an enlarged view of region A of FIG. 2.
Figure 4:
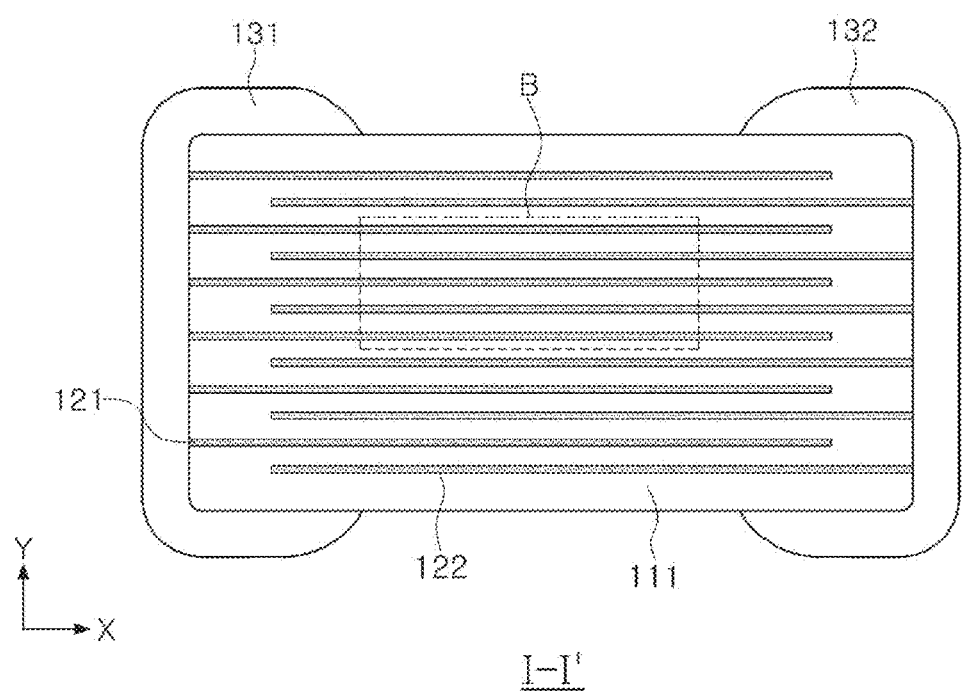
FIG. 4 is a cross-sectional view taken along line I-I' of FIG. 1.
Figure 7A:
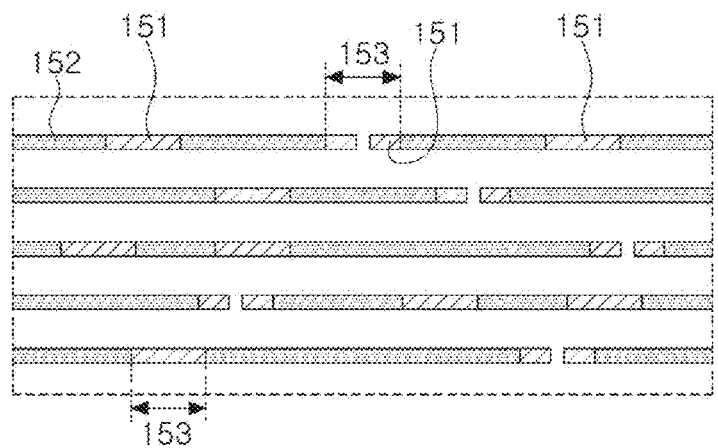
Figure 7B:
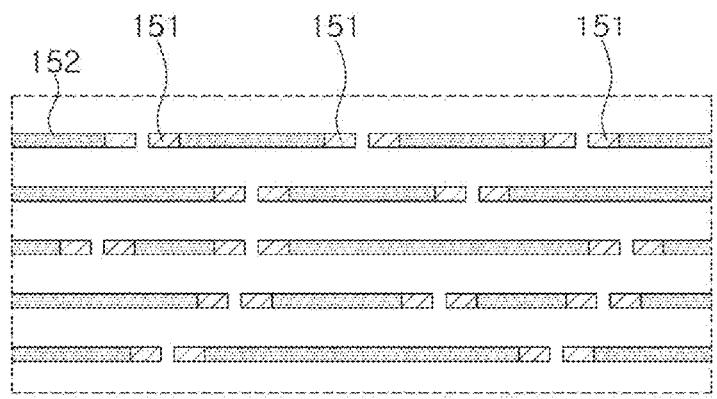

As shown in FIGS. 3 and 7, in an embodiment, the area fraction of the alloying element area relative to the area of the disconnected portion 153 of the internal electrode is 5.0% or more, 5.5% or more, 6.0% or more, 6.5% or more, 7.0% or more, or 7.5% or more, and may be 70% or less, 69% or less, 68% or less, 67% or less, 66% or less, or 65% or less, but is not limited thereto. An area of the disconnected portion 153 of the internal electrode and an area of the alloying element region 151 may be measured in a W-T cross-section and/or an L-T cross-section of the body 110. The area of the disconnected portion 153 of the internal electrode may refer to an area of the disconnected portion of the internal electrode when a trend line is drawn based on a boundary between an internal electrode and a dielectric layer to be measured. In addition, the area of the alloying element region may refer to an area of the alloying element present in the area of the disconnected portion of the internal electrode. Some disconnected portion 153 of the internal electrodes may be partially filled with the alloying element regions, and the other disconnected portion 153 of the internal electrodes may be fully filled with the alloying element region as shown FIGS. 3A and 7A. In other embodiment, all disconnected portion 153 of the internal electrodes may be partially filled with the alloying element regions as shown FIGS. 3B and 7B. The area of the disconnected portion of the internal electrode and the area of the alloying element region may be calculated using the above-described image analysis software or the like.

When the alloying element region, included in the internal electrode, has an area less than 5% with respect to the area of the disconnected portion of the internal electrode, chip strength and moisture resistance reliability may be lowered. When the alloying element region, included in the internal electrode, has an area greater than 70% with respect to the area of the disconnected portion of the internal electrode, chip strength may be improved but moisture resistance reliability and capacitor capacitance may be lowered because the alloying element moves to the boundary between the dielectric layer and the internal electrode, or the like, rather than the disconnected portion of the internal electrode.

In an embodiment, the body 110 may include a dielectric layer 111 and an internal electrode.

A detailed shape of the body 110 is not limited to any specific shape. However, as illustrated, the body 110 may have a hexahedral shape or a shape similar thereto. Due to shrinkage of ceramic powder particles included the body 110 during a sintering process, the body 110 may have a substantially hexahedral shape rather than an exact hexahedron having completely straight lines. The body 110 may have first and second surfaces S1 and S2 opposing each other in a thickness direction (a Z direction), third and fourth surfaces S3 and S4, connected to the first and second surfaces S1 and S2, opposing each other in a length direction (an X direction), and fifth and sixth surfaces S5 and S6, connected to the first and second surfaces S1 and S2 as well as to the third and fourth surfaces S3 and S4, opposing each other in a width direction (a Y direction).

The body 110 may be formed by alternately laminating a ceramic green sheet, on which the first internal electrode 121 is printed, and a ceramic green sheet, on which the second internal electrode 122 is printed, on the dielectric layer 111 in the thickness direction (the Z direction).

In an example, the dielectric layers 111 and the internal electrodes 121 and 122 may be alternately laminated in the first direction. A plurality of dielectric layers 111 may be in a sintered state, and adjacent dielectric layers 111 may be integrated with each other such that boundaries therebetween are not readily apparent without using a scanning electron microscope (SEM).

According to an embodiment, a material of the dielectric layer 111 is not limited to any particular material as long as sufficient capacitance can be obtained therefrom. For example, the material of the dielectric layer 111 may be a barium titanate-based material, a lead composite perovskite-based material, a strontium titanate-based material, or the like.

In addition, various ceramic additives, organic solvents, plasticizers, binders, dispersants, and the like, may be added to the powder particles such as barium titanate ($BaTiO_3$), or the like, depending on the object of the present disclosure.

For example, the dielectric layer 111 may be formed by applying and drying slurries, formed to include powder particles such as barium titanate ($BaTiO_3$), on a carrier film to prepare a plurality of ceramic sheets. The ceramic sheet maybe formed by mixing ceramic powder particles, a binder, and a solvent to prepare slurries and forming the slurries into a sheet type having a thickness of several micrometers (μm) by a doctor blade method, but a method of forming the ceramic sheet is not limited thereto.

In an example, an average thickness of the dielectric layer 111 may be 0.4 μm or less. The average thickness of the dielectric layer 111 may be an average of values measured in five different points of the sintered dielectric layer 111. A lower limit of the average thickness of the dielectric layer 111 is not limited, but may be, for example, 0.01 μm or more.

In an example, a plurality of internal electrodes 121 and 122 may be disposed to oppose each other with the dielectric layer 111 interposed therebetween. The internal electrodes 121 and 122 may include a first internal electrode 121 and a second internal electrode 122, which are alternately disposed to oppose each other with the dielectric layer 111 therebetween.

The first internal electrode 121 may be exposed to one surface of the body 110 in the second direction (the X direction) and a portion, exposed to one surface of the body 110 in the second direction (the X direction), may be connected to the first external electrode 131. The second internal electrode 122 may be exposed to the other surface of the body 110 in the second direction (the X direction) and a portion, exposed to the other surface of the body 110 in the second direction (the X direction), may be connected to the external electrode 132. The first and second internal electrodes 121 and 122 may be electrically separated from each other by the dielectric layer 111 disposed therebetween.

A material of the first and second internal electrodes 121 and 122 is not limited, and the first and second internal electrodes 121 and 122 may be formed using a conductive paste including at least one, for example, silver (Ag), palladium (Pd), gold (Au), platinum (Pt), nickel (Ni), copper (Cu), tin (Sn), tungsten (W), palladium (Pd), titanium (Ti), or alloys thereof. As the printing method of the conductive paste may be a screen-printing method, a gravure printing method, or the like, but is not limited thereto.

In an example, a conductive paste, forming the internal electrode, may include the above-mentioned alloying elements other than the component. The alloying elements, included in the conductive paste, may have a range of 0.01 wt % to 15 wt % relative to the total weight of the conductive paste forming the internal electrode. When the content of the alloying element, included in the conductive paste, is less than 0.01 wt % relative to the internal electrode, desired moisture resistance reliability may not be secured. When the content of the alloying element is more than 15 wt %, the alloying element may permeate not only a disconnected portion of an internal electrode but also a dielectric layer, and thus, a secondary phase may be formed to cause a defect.

In an embodiment, after the above-mentioned conductive paste may be printed on a ceramic green sheet and a plurality of printed conductive pastes are laminated, they are sintered to form internal electrodes. Nickel and alloying elements, contained in the conductive paste, may be in the form of an alloying element coated on surfaces of nickel powder particles. When a conductive paste, including nickel and an alloying element, having such a shape is sintered to form a sintering electrode, an internal electrode, including of an alloy region, may be formed and an alloying element may be exuded from the disconnected portion of the internal electrode during the sintering process to form an alloying element region. Thus, pores of the internal electrode may be removed to improve chip strength and to effectively prevent permeation of external moisture.

An average thickness of the first and second internal electrodes 121 and 122 may be 0.41 μm or less. The average thickness of the internal electrodes 121 and 122 may be an average of values measured in five different points of the sintered internal electrodes 121 and 122. A lower limit of the average thickness of the first and second internal electrodes 121 and 122 may not limited, but may be, for example, 0.01 μm or more.

According to an embodiment, connectivity of internal electrodes, defined as a ratio of an actual length of an internal electrode to an entire length of the respective one of the internal electrodes 121 and 122, may be 70% or more. The entire length of the internal electrode may also include lengths of portions of the disconnected portions. According to an embodiment, the connectivity of internal electrodes may be defined as a ratio of an actual length of a portion, in which an internal electrode is formed, to the total length of the internal electrodes (the actual length of the portion in which an internal electrode is formed/the total length of the internal electrodes)

In an example, the first external electrode 131 and the second external electrode 132 maybe disposed on both surfaces of the body 110 in a second direction. The first external electrode 131 may be electrically connected to the first internal electrode 121, and the second external electrode 132 maybe electrically connected to the second internal electrode 122.

The first and second external electrodes 131 and 132 may be disposed to extend to both surfaces of the body 110 in a first direction (a Z direction) and in a third direction (a Y direction) of the body 110. In this case, the first and second external electrodes 131 and 132 may extend to portions of the first and second surfaces 1 and 2 of the body 110. In addition, the first and second external electrodes 131 and 132 may extend to portions of the fifth and sixth surfaces 5 and 6 of the body 110.

The first and second external electrodes 131 and 132 may be formed using a conductive paste including, for example, at least one of silver (Ag), palladium (Pd), gold (Au), platinum (Pt), nickel (Ni), tin (Sn), copper, copper (Cu), tungsten (W), palladium (Pd), titanium (Ti), or alloys thereof and a glass. A printing method of the conductive paste may be a screen-printing method, a gravure printing method, or the like, but is not limited thereto.

Figure 5:
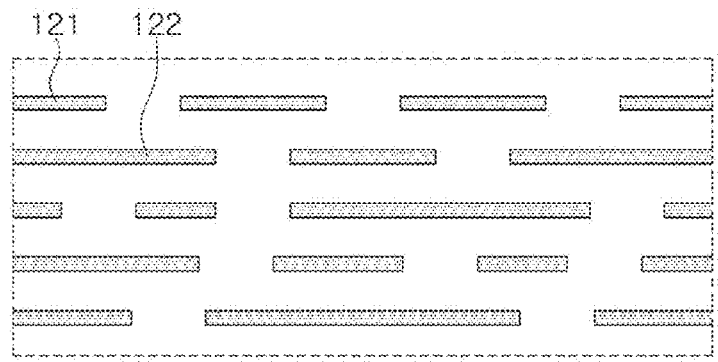
FIGS. 5 to 7 are schematic diagrams illustrating a procedure of filling a short portion of an internal electrode according to an embodiment in the present disclosure.
Figure 6:
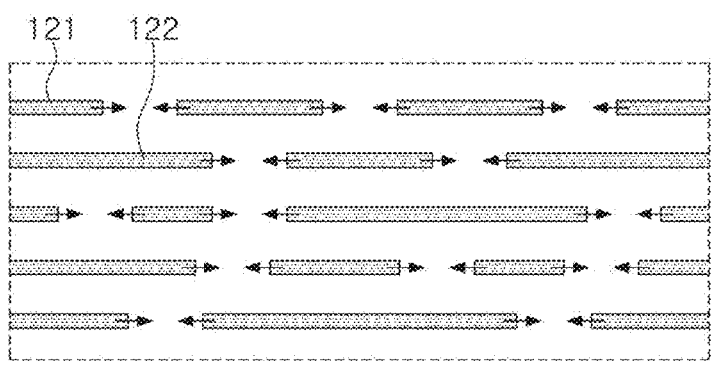

FIGS. 5 to 7 are schematic diagrams illustrating a procedure of filling a short portion of an internal electrode according to an embodiment in the present disclosure. Referring to FIG. 5, immediately after sintering starts, nickel and an alloying element are alloyed in internal electrodes 121 and 122, and no additional component is exuded outwardly.

After a certain period of time has elapsed, excessive alloying elements, remaining after nickel and the alloying element are alloyed, start to be exuded outwardly of the internal electrode, as illustrated in FIG. 6. The exuded alloying elements fill a disconnected portion of the internal electrode (see FIG. 7).

Figure 8:
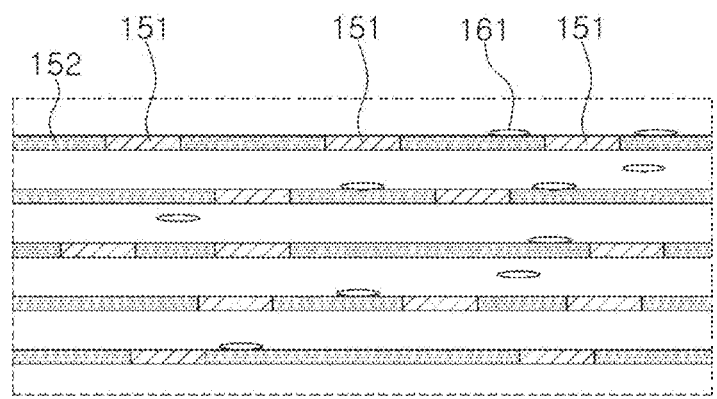
FIG. 8 is a schematic view illustrating a case in which an excessive amount of an alloying element is added.

FIG. 8 is a schematic view illustrating a case in which an excessive amount of an alloying element is added. Referring to FIG. 8, when the amount of the exuded alloying element is too large, an alloying element region 151 may be formed in a disconnected portion of an internal electrode, but an excessive amount of exuded alloying element may permeate into a dielectric layer to form a secondary phase 161. Due to such a secondary phase, a component failure may occur. The secondary phase may cause interfacial degradation between the dielectric layer and the internal electrode, or may reduce capacitance.

Table 1 is an experimental result for chip strength, reliability, and capacity evaluation depending on a ratio of a filled alloying element to an area of a disconnected portion of the internal electrode. In Table 1, all internal electrodes were formed on using a material coated on a surface of nickel (Ni) with silicon (Si) as an alloying element, and capacitor components were manufactured under the same conditions, except that contents of alloying elements were different from each other.

In Table 1, the ratio of a filled alloying element to an area of a disconnected portion of the internal electrode was analyzed using image analysis software (the National Institutes of Health (NIH) open source, "Image J") after capturing a W-T cross-section of a manufactured capacitor component in the range of 60 μm X 40 μm by a transmission electron microscope (TEM) at 40K magnification. In addition, chemical component and composition of the internal electrode and the alloying element were analyzed by applying energy dispersive spectroscopy (EDS), electron energy loss spectroscopy (EELS), or the like.

In Table 1, when capacitance deviates from ±30% relative to upper and lower limits of reference capacitance, it was evaluated as X. When capacitance does not deviate from ±30% relative to upper and lower limits of reference capacitance, it was evaluated as ○. When capacitance does not deviate from ±10% relative to upper and lower limits of reference capacitance, it was evaluated as ◉. A moisture resistance reliability test investigated the number of failed capacitor components, deteriorating more than 1.0 E+1, as compared with an initial value, among 40 samples, when a reference voltage was applied for 12 hours at a temperature of 85 degrees Celsius and a relative humidity of 85% RH.

To measure the chip strength, compressive fracture strength was measured using a common tensile compression measuring apparatus such as TIRA, Universal tensile machine (UTM), or the like, after aligning a multilayer ceramic capacitor (MLCC) chip in a W-T or L-T direction (a direction perpendicular to an internal direction). It can be understood that the chip strength is gradually increased with an increase in a ratio of a filled alloying element to an area of a disconnected portion of the internal electrode, and is gradually increased due to reduction in pores disconnected between internal electrodes as alloying elements increases in number.

TABLE 1

| RATIO OF FILLED ALLOYING ELEMENT TO AREA OF DISCONNECTED PORTION | CHIP STRENGTH (%) | RELIABILITY (NUMBER OF FAILURES) | CAPACITANCE |
| --- | --- | --- | --- |
| 5 | 60 | 4/400 | ○ |
| 10 | 70 | 0/400 | ○ |
| 20 | 80 | 0/400 | ○ |
| 30 | 85 | 0/400 | ○ |
| 40 | 90 | 0/400 | ◉ |
| 50 | 95 | 0/400 | ◉ |
| 60 | 100 | 4/400 | X |

As can be seen from Table 1, when the ratio of a filled alloying element to an area of a disconnected portion of the internal electrode is 5% or less, chip strength and moisture resistance reliability are lowered and, when the ratio is 60% or more, moisture resistance is lowered and capacitance of a capacitor is not sufficiently secured.

Figure 9:
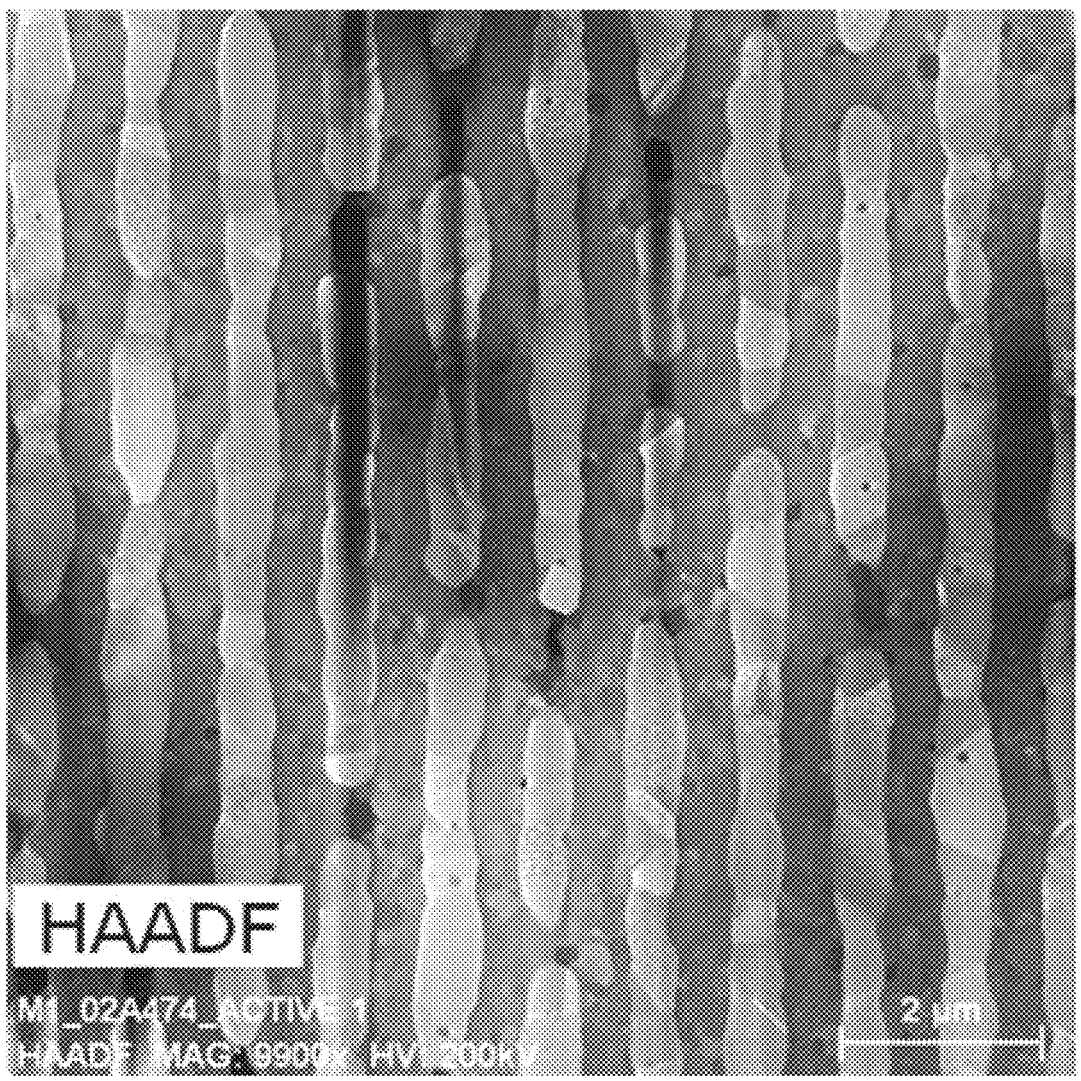
FIGS. 9 to 15 are images, captured by a transmission electron microscope (TEM), illustrating cross-sections of a capacitor component according to an embodiment in the present disclosure.
Figure 13:
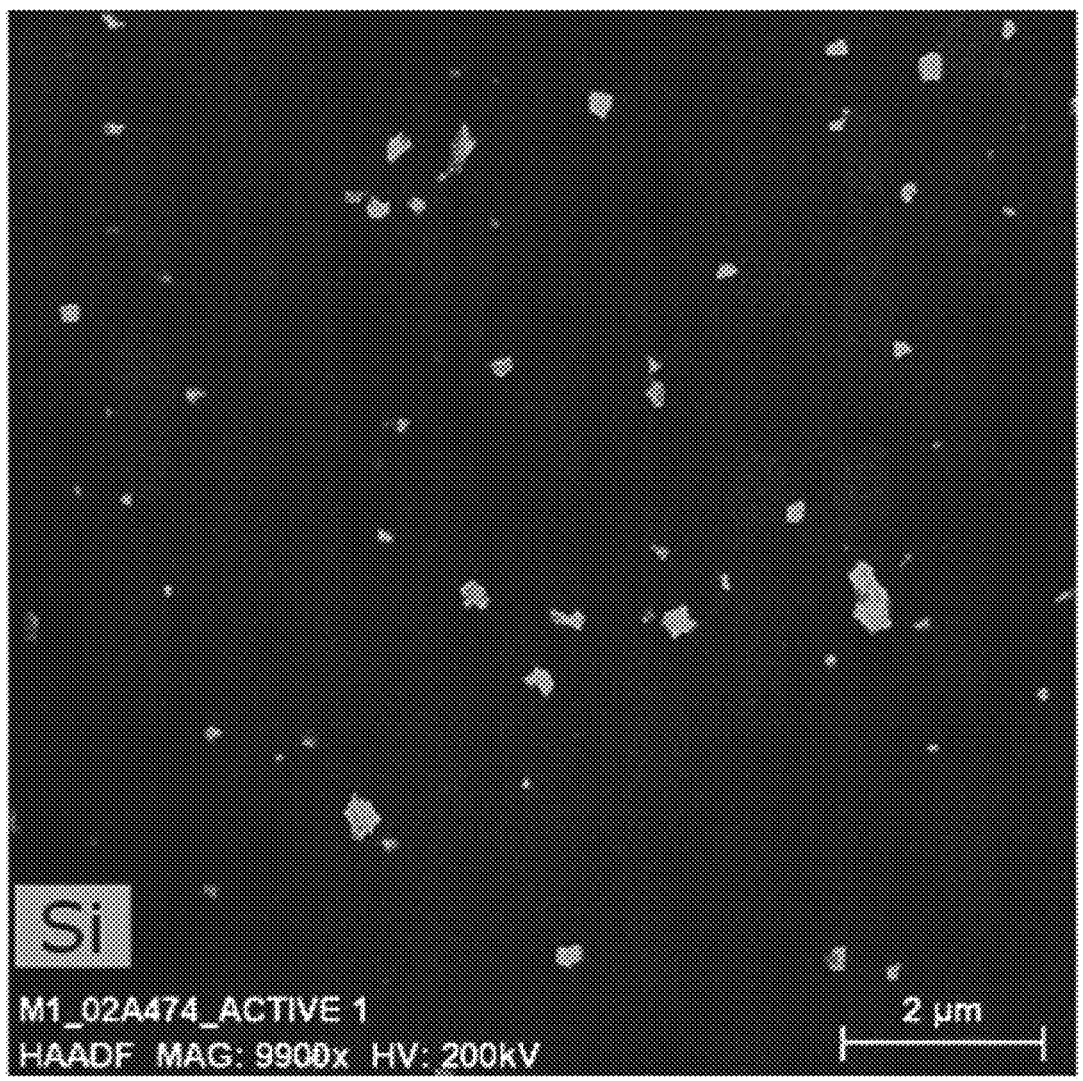
Figure 14:
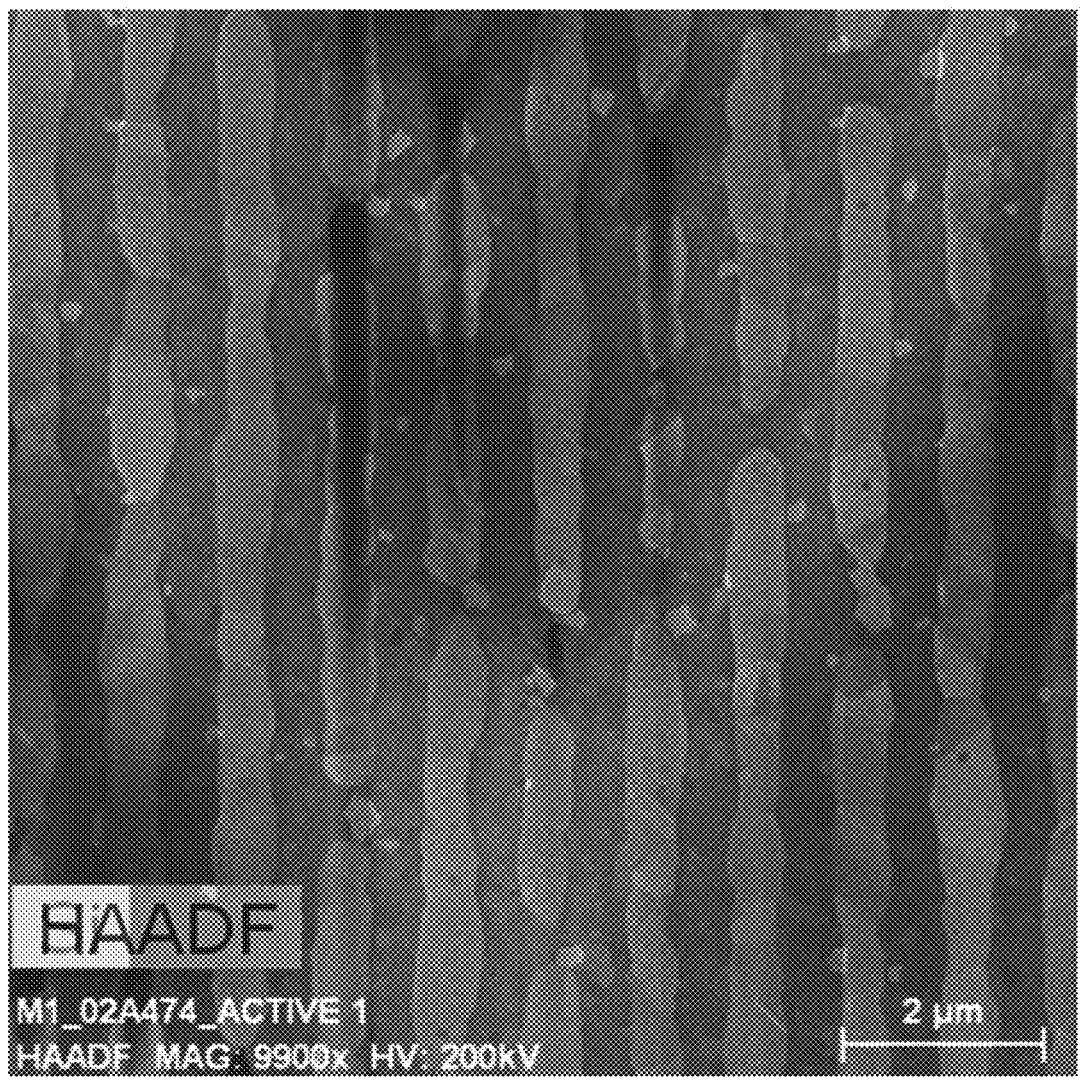
Figure 15:
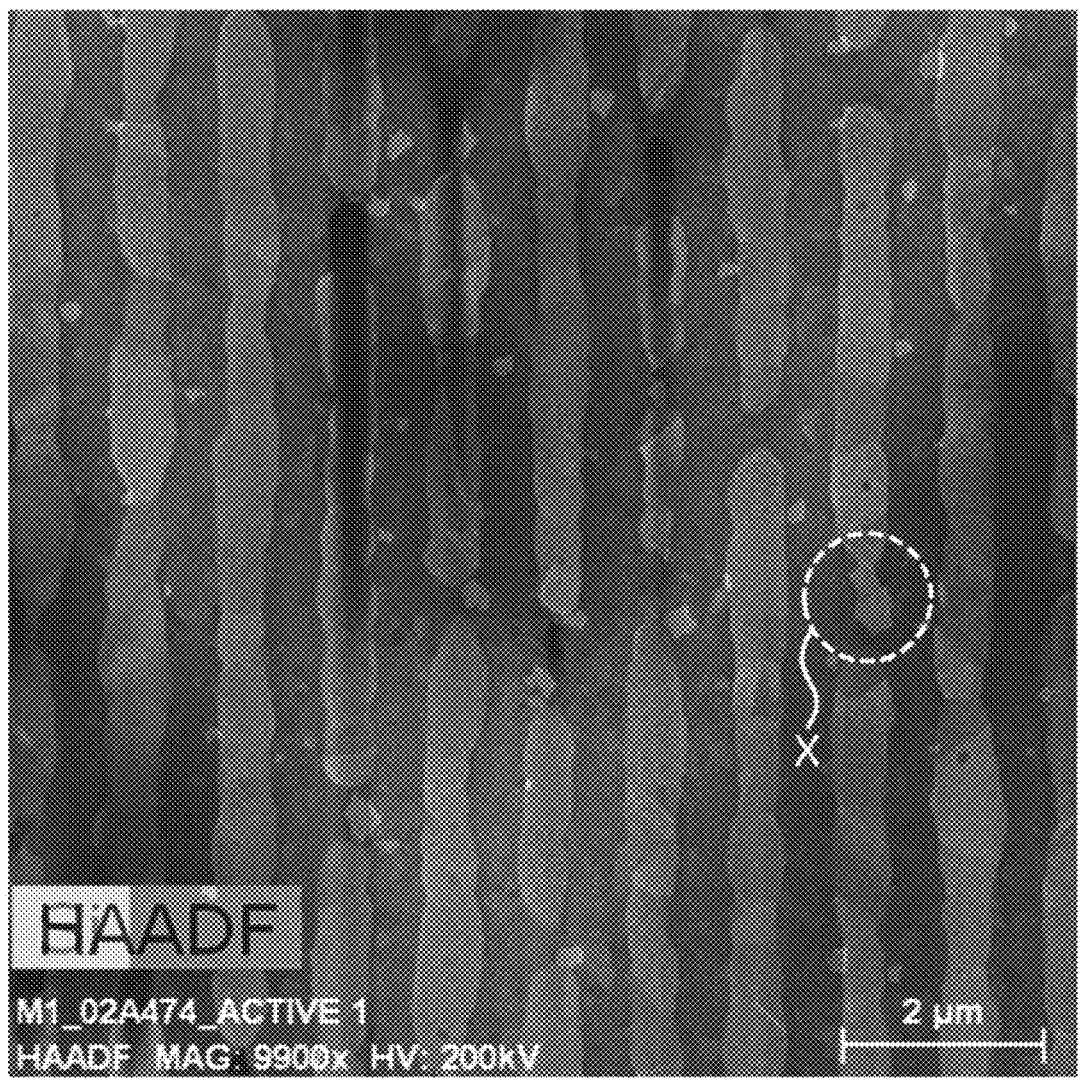

FIGS. 9 to 15 are images obtained by capturing an internal electrode of a capacitor component according to the present disclosure. Referring to FIGS. 9 and 15, distributions of detailed ingredients of a capacitor component, in which Si is applied to a Ni-containing internal electrode as an alloying element, may be checked using energy dispersive spectroscopy (EDS) or electron energy loss epectroscopy (EELS) in a TEM.

Figure 10:
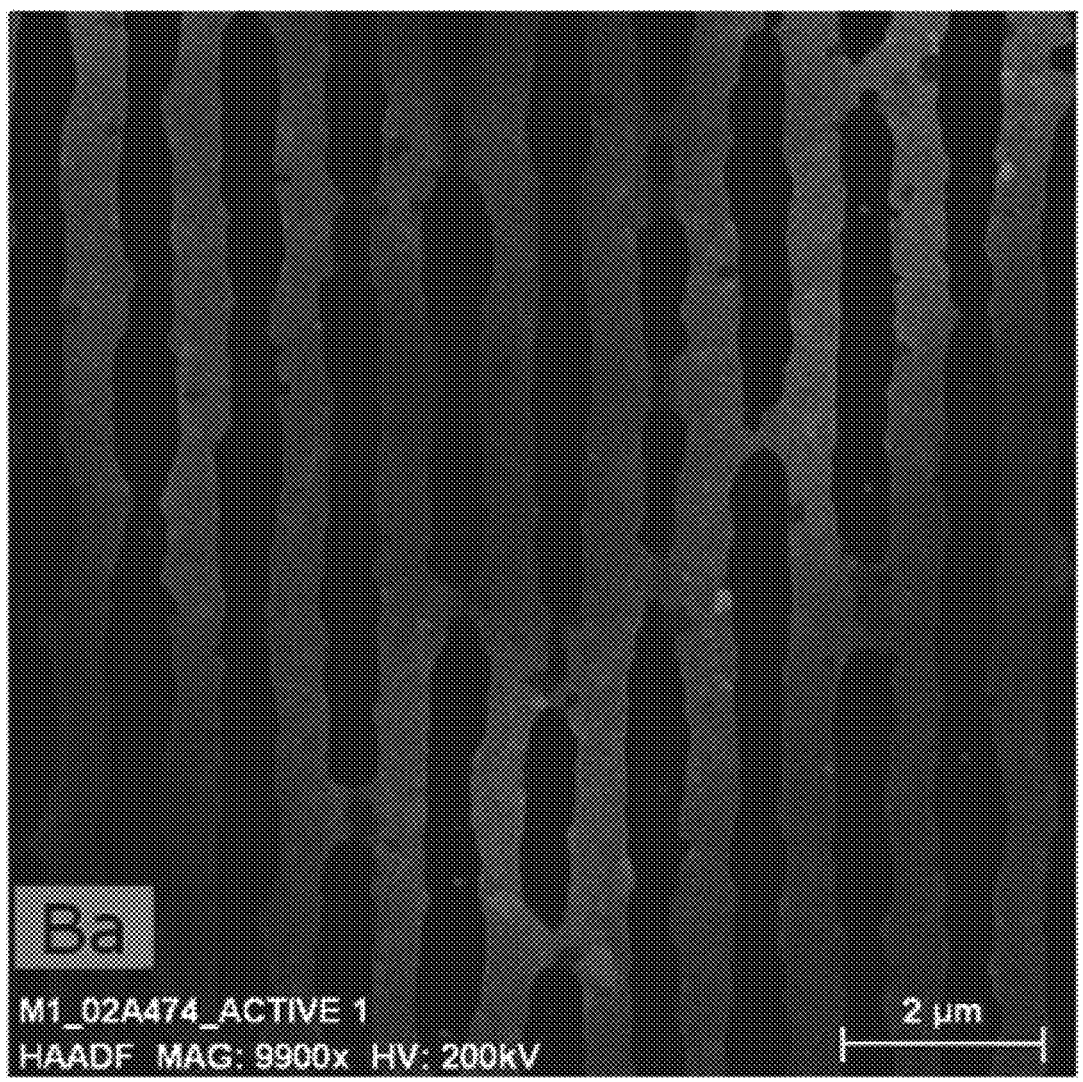
Figure 11:
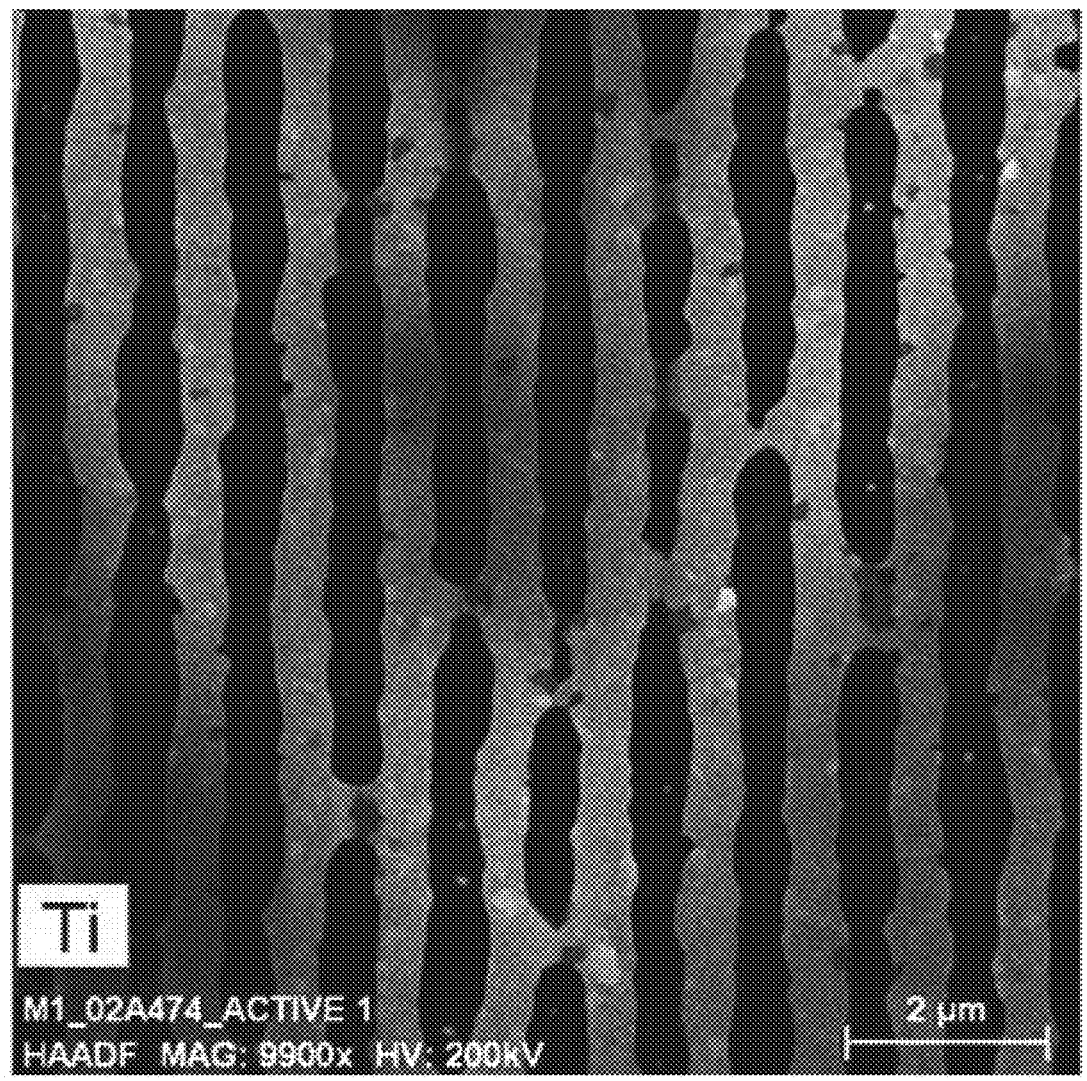
Figure 12:
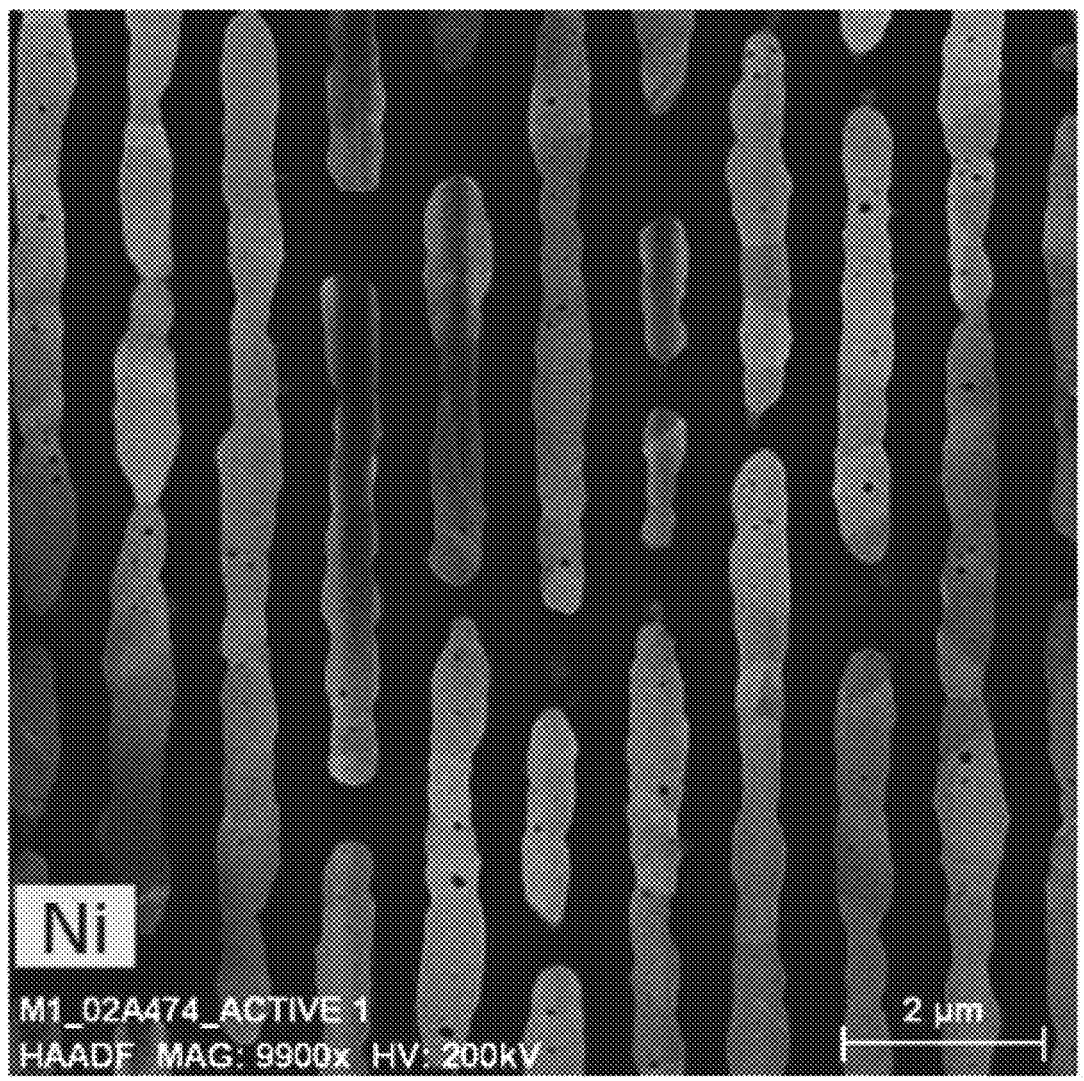

FIG. 9 is a TEM high-angle annular dark field (TEM-HAADF) image of an L-T surface of a manufactured MLCC, and FIGS. 10 to 12 are images illustrating components corresponding to barium (Ba), titanium (Ti), and nickel (Ni), respectively. Referring to FIG. 12, a disconnected portion of an Ni-containing internal electrode may be checked. The disconnected portion may also be checked through FIGS. 10 and 11. As can be seen from FIGS. 10 and 11, Ba and Ti components, constituting a dielectric layer, are disposed in disconnected portions of the internal electrodes of FIG. 12.

As can been from FIG. 13, silicon (Si), an alloying element, is uniformly distributed inside of the internal electrode, and Si is exuded in the disconnected portion of the internal electrode. This means that Ni and Si, included in a conductive paste for the internal electrode, form an alloy to form the internal electrode, and means that an excessive amount of Si, an alloying element, larger than an amount required for formation of the internal electrode, may be exuded to fill the disconnected portion of the internal electrode.

FIGS. 14 and 15 are images formed by combining FIG. 13 with FIG. 12. As can be seen from FIGS. 12, 14, and 15, Si, an alloying element, is exuded to fill the disconnected portion of the internal electrode of FIG. 12. Region X of FIG. 15 represents a portion in which Si is exuded, and the exuded alloying element may fill the disconnected portion of the internal electrode, similarly to the region X, to improve connectivity of the internal electrode and to improve chip strength and moisture resistance reliability.

As described above, according to an embodiment, a disconnected portion of an internal electrode may be compensated for to improve moisture resistance reliability of a capacitor component.

According to another embodiment, a porous portion may be removed to prevent moisture permeation into a capacitor component.

According to another embodiment, a bonding area of an internal electrode and an external electrode may be increased to improve chip strength.

While example embodiments have been shown and described above, it will be apparent to those skilled in the art that modifications and variations could be made without departing from the scope of the present disclosure as defined by the appended claims.

What is claimed is:

1. A capacitor component comprising:
   a body including a dielectric layer and an internal electrode disposed on the dielectric layer in a stacking direction, the internal electrode including nickel and an alloying element; and
   an external electrode disposed on the body to be connected to the internal electrode,
   wherein the internal electrode includes an alloy region and an alloying element region,
   wherein the alloying element region is disposed in a disconnected portion of the internal electrode and extends from the internal electrode in a direction perpendicular to the stacking direction,
   wherein the alloy region includes an alloy of the nickel and the alloying element, and
   wherein the alloying element region is a region in which the alloying element is used as a main ingredient.

2. The capacitor component of claim 1, wherein the alloying element is a period 3 element, a period 4 element, or one or more of group 4 to 11 elements on the periodic table of elements.

3. The capacitor component of claim 1, wherein the alloying element includes at least one of silicon (Si), aluminum (Al), magnesium (Mg), iron (Fe), phosphorus (P), tin (Sn), zinc (Zn), dysprosium (Dy), copper (Cu), or alloys thereof.

4. The capacitor component of claim 1, wherein the alloying element includes two or more of silicon (Si), aluminum (Al), magnesium (Mg), iron (Fe), phosphorus (P), tin (Sn), zinc (Zn), dysprosium (Dy), copper (Cu), or alloys thereof.

5. The capacitor component of claim 1, wherein the alloying element region satisfies an area fraction of more than 5% and less than 60% relative to the disconnected portion of the internal electrode.

6. The capacitor component of claim 1, wherein a weight of the alloying element is in a range of 0.01 wt % to 15 wt %, relative to a total weight of a conductive paste forming the internal electrode.

7. The capacitor component of claim 1, wherein the internal electrode includes a sintered element of nickel having a surface on which the alloying element is coated.

8. The capacitor component of claim 1, wherein the internal electrode has an average thickness of 0.41 μm or less.

9. The capacitor component of claim 1, wherein the dielectric layer has an average thickness of 0.4 μm or less.

10. The capacitor component of claim 1, wherein connectivity of the internal electrode, defined as a ratio of an actual length of the internal electrode to an entire length of the internal electrode, is 70% or more.

* * * * *